United States Patent
Sasaki et al.

(10) Patent No.: US 7,034,508 B1
(45) Date of Patent: Apr. 25, 2006

(54) CONTROL APPARATUS FOR AUTOMOTIVE GENERATOR

(75) Inventors: Junya Sasaki, Tokyo (JP); Katsuyuki Sumimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/245,066

(22) Filed: Oct. 7, 2005

(30) Foreign Application Priority Data

Apr. 21, 2005 (JP) .............................. 2005-123513

(51) Int. Cl.
*H20P 5/20* (2006.01)

(52) U.S. Cl. .............................. 322/28; 322/17; 322/14; 322/29; 322/7; 322/9

(58) Field of Classification Search .................. 322/28, 322/17, 14, 29, 7, 9
See application file for complete search history.

(56) References Cited

U.S. PATENT DOCUMENTS

| 3,820,009 | A | * | 6/1974 | Itoh et al. ...................... 322/28 |
| 5,734,239 | A | * | 3/1998 | Turner ......................... 318/142 |
| 6,486,639 | B1 | * | 11/2002 | Montret et al. ............... 322/29 |
| 6,794,854 | B1 | * | 9/2004 | Nakatsu et al. ............... 322/27 |
| 6,819,007 | B1 | * | 11/2004 | Fukaya ...................... 290/40 C |

FOREIGN PATENT DOCUMENTS

JP 2002-281792 A 9/2002

* cited by examiner

*Primary Examiner*—Darren Schuberg
*Assistant Examiner*—Iraj A. Mohandesi
(74) *Attorney, Agent, or Firm*—Sughrue Mion, PLLC

(57) ABSTRACT

An A/D conversion device includes a counter for counting a clock signal fed from a clock signal generator, a D/A converter for converting a digital output of the counter into an analog value, a comparator for comparing an analog output of the D/A converter and an analog field current detection value fed from a current detecting resistor and outputting a result of comparison, and an up/down control circuit for switching the counter between count-up and count-down operations according to the result of comparison output from the comparator. The output of the counter is transmitted as a digital field current detection value to an external control unit which is an ECU of a vehicle via a communication interface.

10 Claims, 9 Drawing Sheets

CONTROL APPARATUS FOR AUTOMOTIVE GENERATOR

BACKGROUND OF THE INVENTION

1. Field of the Invention

The present invention relates to a control apparatus for controlling an automotive generator installed on a vehicle according to a detected value of an electric current flowing through a field circuit of the generator and, more particularly, the invention pertains to an automotive generator control apparatus which is less susceptible to external noise or disturbances in detecting the value of an electric current flowing in a field circuit of the generator.

2. Description of the Background Art

Today, a common approach to improving fuel economy of an engine of a vehicle is to employ a system in which a control unit of the vehicle monitors power generation conditions of an automotive generator, estimates the amount of generator driving torque and controls engine speed, for instance. There exist some conventionally known methods of monitoring the amount of power generated by an automotive generator. One known method is to monitor the rate of switching on/off actions of a field current controlling transistor. This method however has a problem that the transistor ON/OFF rate does not necessarily correspond to the amount of the generator driving torque depending on operating conditions of the generator. Under such circumstances, there has been a need for a method of obtaining highly accurate information on the amount of power generated by the automotive generator. A solution to this problem is to monitor the value of a field current. For example, Japanese Patent Application Publication No. 2002–281792 discloses some methods of monitoring the value of a field current.

Since the value of a field current flowing in a field circuit of an automotive generator can be used as an important parameter for controlling the generator, it is necessary to monitor the field current value if the same is to be used for control purposes. Currently, there is a need for on-line transmission of the field current value to an engine control system. To alleviate work load applied to an electronic control unit (ECU) provided in a vehicle and to reduce the influence of noise induced in a transmission line, it is advantageous if the generator incorporates an analog-to-digital (A/D) converter so that the field current value is A/D-converted on the generator side and a resultant digital value is transmitted to the ECU.

A/D converters widely used in industrial applications are so-called successive approximation type A/D converters. Generally, the automotive generator is disposed in an engine room where the generator is exposed to extremely harsh ambient conditions so that the A/D converter, if used for controlling the generator, might be adversely affected by noise. The successive approximation type A/D converter determines the value of each bit by the method of false position, or the regula falsi method. Therefore, if noise is induced during execution of sampling operation by the A/D converter, a large amount of calculation error is likely to occur. Consequently, if the A/D converter of this kind is used in the automotive generator, there arises a problem that it is difficult to transmit a highly reliable field current value to the ECU.

SUMMARY OF THE INVENTION

The present invention is intended to overcome the aforementioned problems of the prior art. Accordingly, it is an object of the invention to provide an automotive generator control apparatus capable of providing useful information for controlling the generator by using an A/D converter which is less susceptible to external noise or disturbances in monitoring the value of a field current flowing in the generator with a minimum increase in circuit scale.

In one principal form of the invention, a control apparatus for controlling an automotive generator includes a field current detector for detecting a field current flowing through a field circuit of the automotive generator, and an A/D conversion device for converting an analog field current detection value detected by the field current detector into a digital value and outputting the digital value to an external control unit. The A/D conversion device includes a counter, a digital-to-analog (D/A) converter for converting a digital output of the counter into an analog value, a comparator for comparing an output of the D/A converter and the analog field current detection value, and an up/down control circuit for switching the counter between count-up and count-down operations according to an output of the comparator such that the output of the D/A converter follows the analog field current detection value. The output of the counter is output to the aforementioned external control unit.

In another principal form of the invention, a control apparatus for controlling an automotive generator includes a field coil to which a DC output voltage of the automotive generator is supplied, a switching device connected in series with the field coil, whereby switching on/off operation of the switching device controls a field current flowing through the field coil, a diode connected in parallel with the field coil for recirculating the field current flowing through the field coil when the switching device is in an OFF state, a field current detector for outputting a voltage generated by a detecting device which is connected in series with the switching device as an analog field current detection value, an A/D conversion device for converting the analog field current detection value detected by the field current detector into a digital value, a current limit value memory for storing a specific current limit value in digital form, a voltage control circuit for outputting an ON/OFF drive signal to the switching device such that the DC output voltage of the automotive generator follows a specific reference voltage, and a current limiter to which an output of the A/D conversion device and the current limit value are input, whereby the current limiter turns off the switching device when the output value of the A/D conversion device exceeds the current limit value regardless of the ON/OFF drive signal. The A/D conversion device includes a counter, a D/A converter for converting a digital output of the counter into an analog value, a comparator for comparing an output of the D/A converter and the analog field current detection value, and an up/down control circuit for switching the counter between count-up and count-down operations according to an output of the comparator such that the output of the D/A converter follows the analog field current detection value. The output of the counter is output to the aforementioned current limiter.

In the aforementioned automotive generator control apparatus of the invention, the A/D conversion device employs an output feedback system realized by using a counter. Therefore, even if the output of the counter contains noise, a resultant error, if any, always occurs at the least significant bit (LSB) only. Accordingly, the A/D conversion device of the automotive generator control apparatus can monitor the value of the field current flowing through the field coil of the generator with high accuracy and reliability without adverse effects of external noise.

These and other objects, features and advantages of the invention will become more apparent upon reading the following detailed description along with the accompanying drawings.

DETAILED DESCRIPTION OF THE PREFERRED EMBODIMENTS OF THE INVENTION

The invention is now described with reference to specific embodiments thereof illustrated in the accompanying drawings.

First Embodiment

Figure 1:
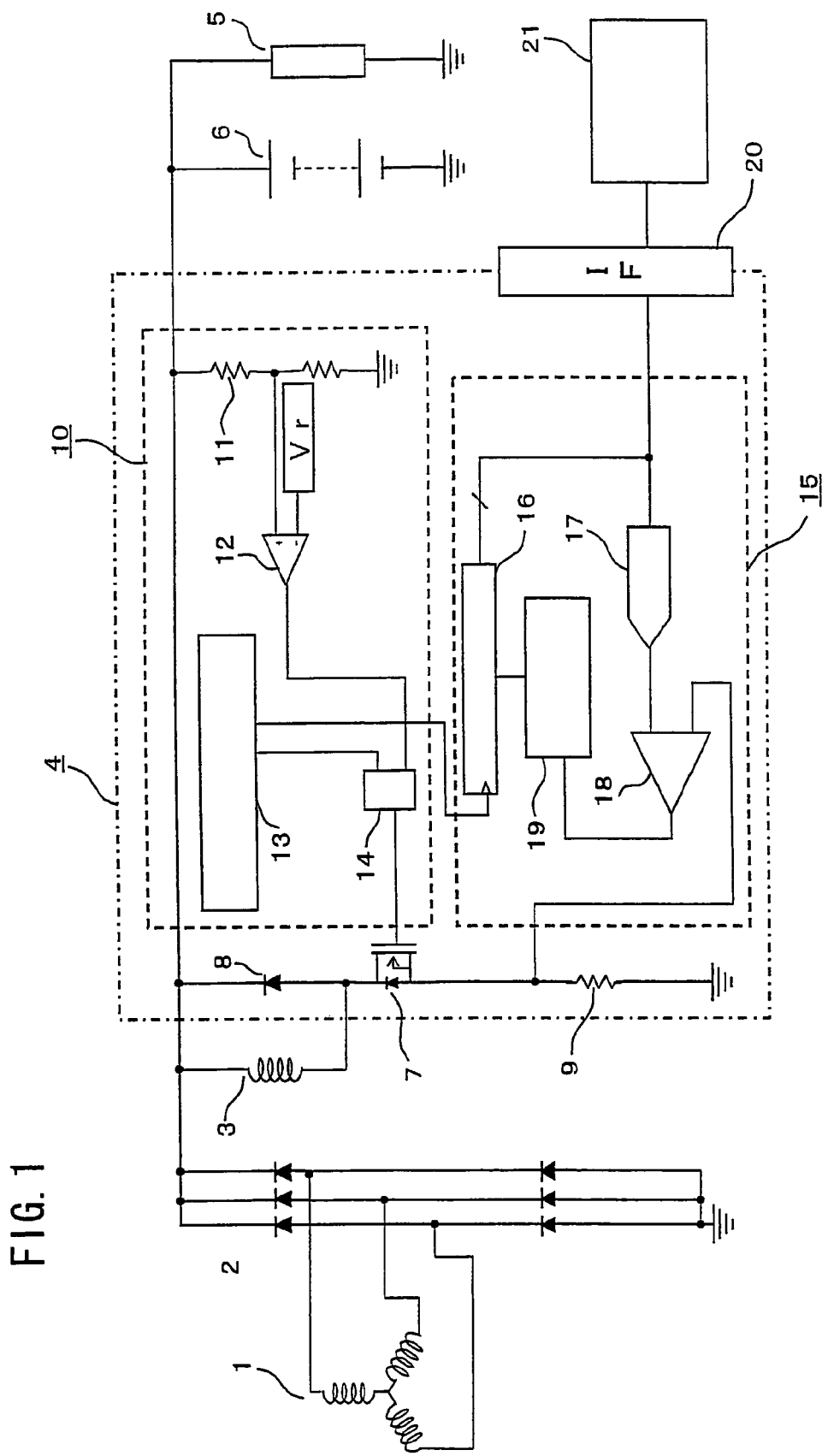
FIG. 1 is a block diagram of a control apparatus for controlling an automotive generator installed on a vehicle according to a first embodiment of the invention.

FIG. 1 is a block diagram of a control apparatus for controlling an automotive generator installed on a vehicle according to a first embodiment of the invention.

The automotive generator of the embodiment includes three-phase armature coils 1, a rectifier 2 for rectifying AC voltages output from the armature coils 1 to produce a DC voltage, a field coil 3 constituting a field circuit into which the DC voltage output from the rectifier 2 is supplied, and a voltage regulator 4 which will be later described in detail. The DC output voltage regulated to a constant voltage level by the voltage regulator 4 is supplied to various electric loads 5 and to a battery 6 for charging the same.

Next, an internal circuit configuration of the voltage regulator 4 which is enclosed by alternate long and short dashed lines is described. Referring to FIG. 1, the voltage regulator 4 includes a transistor 7 connected in series with the field coil 3, a diode 8 connected in parallel with the field coil 3, a current detecting resistor 9 connected in series with the transistor 7, a voltage control circuit 10 which is enclosed by broken lines, and an A/D converter circuit 15 which is also enclosed by broken lines.

The transistor 7 serves as a switching device of which switching on/off operation controls a field current flowing through the field coil 3. The diode 8 serves as a freewheeling diode for recirculating the current fed through the field coil 3 when the transistor 7 is in an OFF state. The current detecting resistor 9 serves as a field current detector for detecting the field current flowing through the field circuit.

The voltage control circuit 10 includes a resistance type voltage divider 11 for dividing the DC voltage output from the voltage regulator 4, a comparator 12 for comparing a divided voltage fed from the resistance type voltage divider 11 and a reference voltage Vr and outputting a result of comparison, and a logic circuit 14 for outputting an ON/OFF drive signal to the transistor 7 such that the aforementioned DC voltage output from the voltage regulator 4 will follow a specific reference voltage. The logic circuit 14 produces the ON/OFF drive signal from a signal fed from the comparator 12 and a signal fed from a clock signal generator 13.

Now, an internal circuit configuration of the A/D converter circuit 15 which is an A/D conversion device constituting a principal part of the invention is described. The A/D converter circuit 15 converts the value of the field current expressed in analog form (hereinafter referred to as the analog field current detection value) detected by the current detecting resistor 9 into a digital value. More specifically, the A/D converter circuit 15 includes a counter 16 for counting a clock signal fed from the clock signal generator 13, a D/A converter 17 for converting a digital output of the counter 16 into an analog value, a comparator 18 for comparing an analog output of the D/A converter 17 and the analog field current detection value fed from the current detecting resistor 9 and outputting a result of comparison, and an up/down control circuit 19 for switching the counter 16 between count-up and count-down operations according to the result of comparison output from the comparator 18. The output of the counter 16 is transmitted as a digital field current detection value to an external control unit 21 which is an ECU of the vehicle via a communication interface 20.

Figure 2:
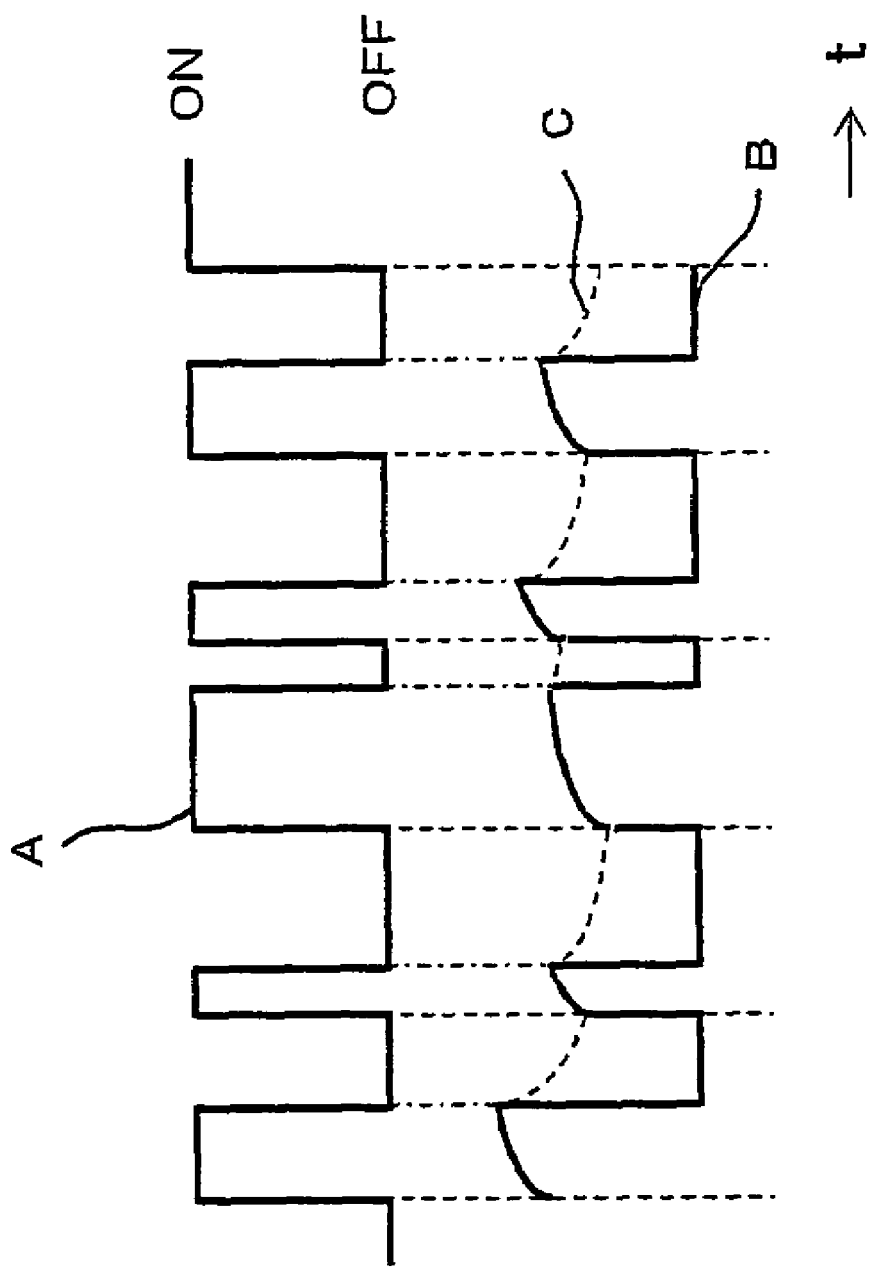
FIGS. 2A and 2B are diagrams showing a waveform of an ON/OFF drive signal and a waveform of an analog field current detection value, respectively.

Operation of the control apparatus of the embodiment is now explained. If the voltage control circuit 10 is of a type which is operated by a pulse width modulation (PWM) control method at specific pulse repetition intervals, for instance, the logic circuit 14 outputs the ON/OFF drive signal to the transistor 7, in which the duration of on-time of successive pulses (or duty factor) of the ON/OFF drive signal is controlled according to the signal output from the comparator 12 in such a manner that the DC voltage output from the voltage regulator 4 will follow the aforementioned reference voltage. FIG. 2A shows a waveform of the ON/OFF drive signal marked by A. During an ON period of the transistor 7, the DC output voltage is applied to the field coil 3 and the field current flows from the field coil 3 through the transistor 7 and then through the current detecting resistor 9. When the transistor 7 turns off, the current which has been flowing through the current detecting resistor 9 is interrupted and, at this point, the analog field current detection value represented by a waveform B shown by solid lines in FIG. 2B appears at the current detecting resistor 9.

Operation of the A/D converter circuit 15 is now explained in detail. If a 2-ampere field current flows through the field coil 3, for example, a feedback value output from the D/A converter 17 is smaller than the analog field current detection value fed from the current detecting resistor 9 immediately after the beginning of operation. Thus, the up/down control circuit 19 causes the counter 16 to count up according to the result of comparison output from the comparator 18 so that the feedback value output from the D/A converter 17 approaches 2 amperes. When the value of the result of comparison output from the comparator 18 is reversed with the feedback value from the D/A converter 17 becoming equal to or larger than the detection value fed from the current detecting resistor 9, that is, when the output of the counter 16 reaches a value equal to or larger than a voltage value corresponding to 2 amperes, the up/down control circuit 19 switches the counter 16 from count-up operation to count-down operation. As the operation of the counter 16 is thus controlled, the value of the output of the counter 16 varies, going up and down beyond and below the value of the field current, as long as the field current remains in a steady state. When the field current varies in this way, the DC voltage output from the voltage regulator 4 follows changes in the field current with a delay time corresponding to a clock rate.

Therefore, if pulse repetition intervals of the clock signal produced by the clock signal generator 13 are made sufficiently shorter than the pulse repetition intervals of pulses used for the aforementioned PWM control operation, or if the frequency of the clock signal is made sufficiently higher than the frequency of the pulses used for the PWM control operation, the digital field current detection value having the same waveform as the waveform B shown by the solid lines in FIG. 2B is output from the counter 16, and thus from the A/D converter circuit 15, to the external control unit 21.

The earlier-mentioned conventional successive approximation type A/D converter determines whether the value of each successive bit, from the most significant bit (MSB) to the least significant bit (LSB), is 0 or 1. Therefore, if the MSB is accidentally contaminated by noise and the A/D converter misjudges the value of the MSB, a great error will occur in a digitized output of the A/D converter.

By comparison, the A/D converter circuit 15 of the present embodiment does not judge whether the value of the MSB is 0 or 1, but the counter 16 always outputs the value 0 or 1 corresponding to the level of the LSB. Accordingly, even if the output of the counter 16 is accidentally contaminated by noise, a resultant error is almost negligible.

It follows that even if the automotive generator control apparatus of the embodiment is installed in an engine room where the A/D converter circuit 15 is exposed to harsh ambient conditions full of electromagnetic interference and conducted noise, the control apparatus can output a highly reliable digital field current detection value to the external control unit 21 of the vehicle.

Second Embodiment

Figure 3:
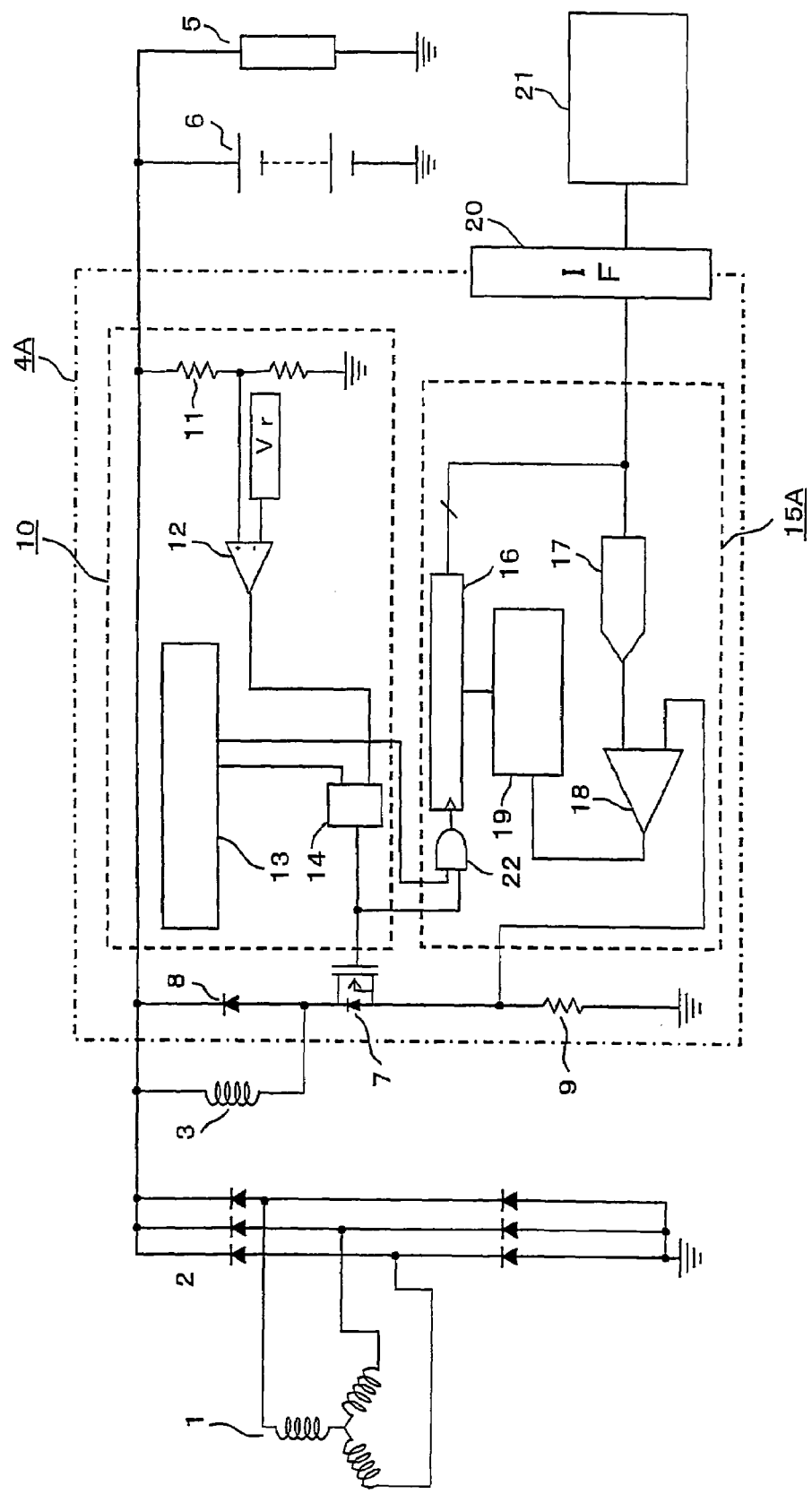
FIG. 3 is a block diagram of a control apparatus for controlling an automotive generator installed on a vehicle according to a second embodiment of the invention.

FIG. 3 is a block diagram of a control apparatus for controlling an automotive generator installed on a vehicle according to a second embodiment of the invention.

In the above-described first embodiment, the A/D converter circuit 15 converts the analog field current detection value detected by the current detecting resistor 9 into a digital value, faithfully duplicating the waveform of the analog field current detection value. Specifically, the A/D converter circuit 15 outputs the digital field current detection value having the same waveform as the waveform B shown by the solid lines in FIG. 2B, in which the digital field current detection value becomes 0 during an OFF period of the transistor 7. During the OFF period of the transistor 7, however, there is formed a circuit for recirculating the field current through the diode 8 in the field circuit and, therefore, the current actually flowing through the field coil 3 has a waveform C shown by broken lines in FIG. 2B.

If the circuit configuration shown in FIG. 1 is modified such that the current detecting resistor 9 is connected directly in series with the field coil 3, it would be possible to detect and output an exact value of the field current flowing through the field coil 3. In this modified configuration, however, potential at an output circuit of the current detecting resistor 9, or at an input stage of the A/D converter circuit 15, becomes high. This makes it necessary to take measures to enhance insulation properties of the output circuit of the current detecting resistor 9, resulting in an increase in the size and cost of the automotive generator control apparatus.

The second embodiment of the invention is intended to provide an automotive generator control apparatus capable of delivering a digital output of which waveform closely duplicates that of the field current flowing through the field coil 3 with a simple circuit configuration by efficiently using the aforementioned principle of operation of the A/D converter circuit 15 shown in FIG. 1.

In FIG. 3, elements identical or equivalent to those shown in FIG. 1 are designated by the same reference numerals. The only difference of the automotive generator control apparatus of the second embodiment (FIG. 3) from that of the first embodiment (FIG. 1) lies in an A/D converter circuit 15A. Specifically, in the A/D converter circuit 15A, an AND circuit 22 which serves as a counting operation stopper is inserted on an input side of the counter 16. The clock signal used by the counter 16 for counting operation thereof is fed from the clock signal generator 13 into one input terminal of the AND circuit 22, while the ON/OFF drive signal for controlling on/off operation of the transistor 7 is fed from the logic circuit 14 into the other input terminal of the AND circuit 22.

In the A/D converter circuit 15A of this embodiment, the counter 16 counts the clock signal during the ON period of the transistor 7 only, so that the A/D converter circuit 15A outputs a digital value faithfully duplicating the waveform of the analog field current detection value fed from the current detecting resistor 9. During the OFF period of the transistor 7, the counter 16 does not count the clock signal but holds the same output value as at the end of the preceding ON period of the transistor 7.

While the waveform of the digital field current detection value output from the A/D converter circuit 15A does not exactly match the waveform C shown in FIG. 2B, the output waveform of the A/D converter circuit 15A is assumed to be closer to the waveform C compared to the waveform B obtained in the first embodiment.

It is understood from the foregoing discussion that the A/D converter circuit 15A of the second embodiment can deliver the digital field current detection value closely duplicating the waveform of the field current actually flowing through the field coil 3 by using the current detecting resistor 9 of which one end is grounded as depicted in FIG. 3. This feature of the second embodiment makes it possible to configure the A/D converter circuit 15A with a low level of insulation and, thus, in compact size and at low cost.

Third Embodiment

Figure 4:
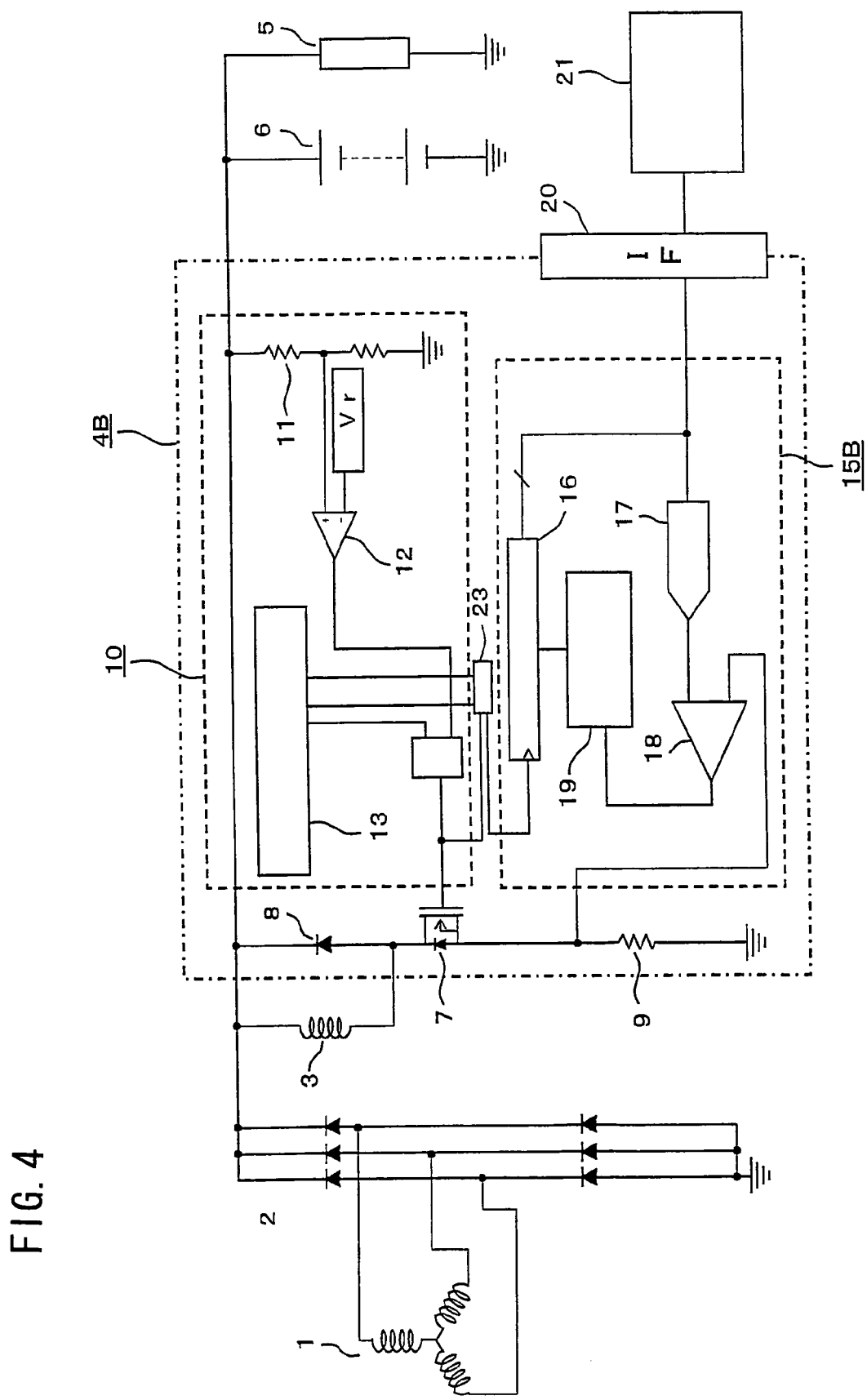
FIG. 4 is a block diagram of a control apparatus for controlling an automotive generator installed on a vehicle according to a third embodiment of the invention.

FIG. 4 is a block diagram of a control apparatus for controlling an automotive generator installed on a vehicle according to a third embodiment of the invention.

Like the above-described second embodiment, the third embodiment of the invention is intended to provide an automotive generator control apparatus capable of delivering a digital output of which waveform closely duplicates that of the field current flowing through the field coil 3 with a simple circuit configuration by efficiently using the aforementioned principle of operation of the A/D converter circuit 15 shown in FIG. 1.

In FIG. 4, elements identical or equivalent to those shown in FIG. 1 are designated by the same reference numerals. The only difference of the automotive generator control apparatus of the third embodiment (FIG. 4) from that of the first embodiment (FIG. 1) lies in an A/D converter circuit 15B. Specifically, in the A/D converter circuit 15B, a selector 23 which serves as a clock frequency switcher is inserted on the input side of the counter 16. The selector 23 outputs a first clock signal of a first clock frequency (which is same as the frequency of the clock signal of the first embodiment) to the counter 16 during the ON period of the transistor 7 and a second clock signal of a second clock frequency to the counter 16 during the OFF period of the transistor 7 according to the ON/OFF drive signal fed from the logic circuit 14. The second clock signal is produced by dividing the first clock frequency of the first clock signal in the clock signal generator 13.

The second clock frequency is set based on a conducting time constant of the field coil 3 in such a manner that the waveform of the digital field current detection value output from the A/D converter circuit 15B duplicates the waveform of the field current flowing through the field coil 3.

Figure 5:
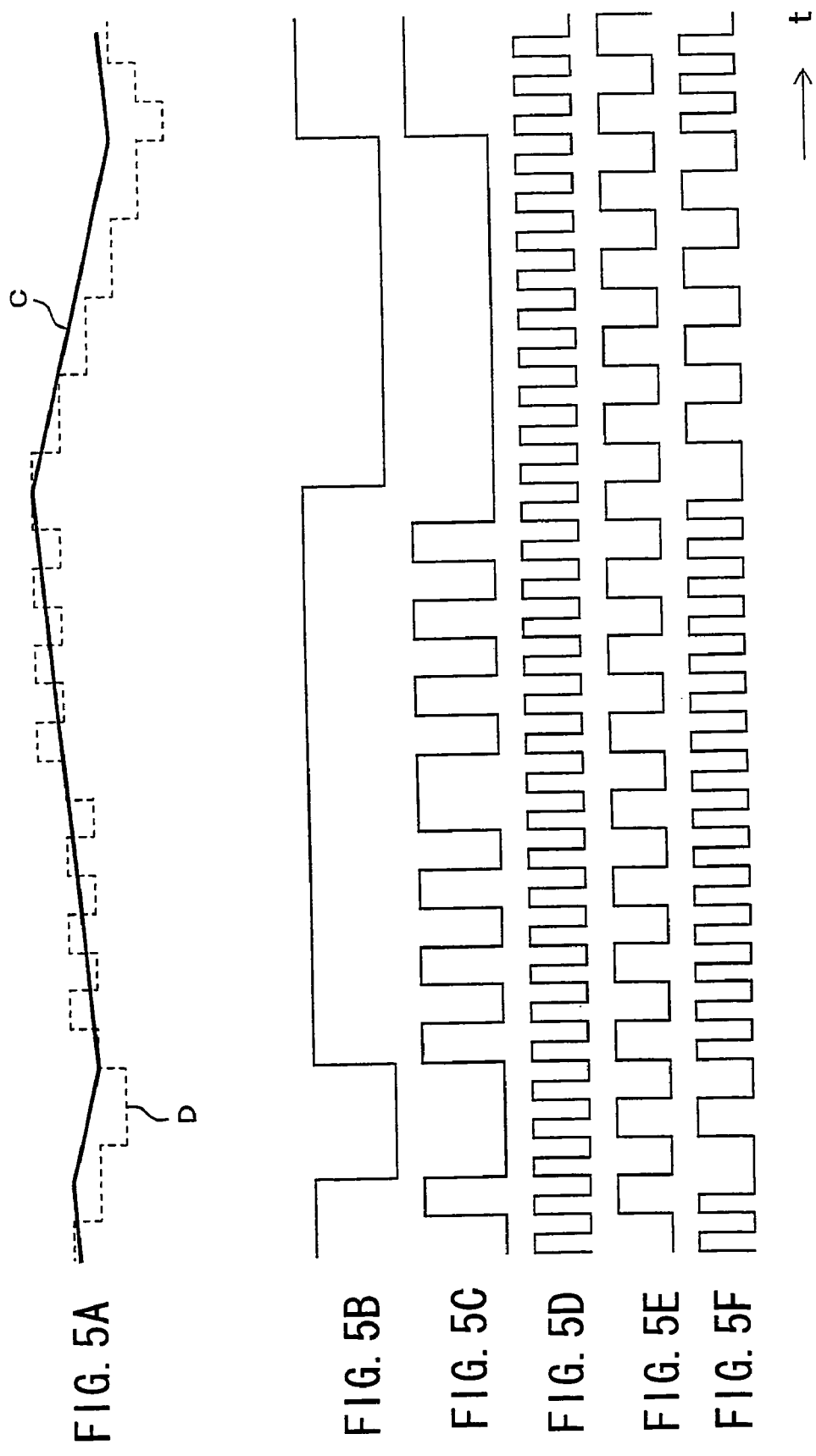
FIGS. 5A to 5F are diagrams showing waveforms of signals observed at various points in an A/D converter circuit of the third embodiment.

FIGS. 5A to 5F are diagrams showing waveforms of signals observed at various points in the A/D converter circuit 15B of the third embodiment. Referring to FIG. 5A, a kinked solid line marked by C is the waveform of the field current flowing through the field coil 3 and broken lines marked by D show the waveform of the digital field current detection value output from the A/D converter circuit 15B. Shown in FIG. 5B is the waveform of the ON/OFF drive signal supplied to the transistor 7, shown in FIG. 5C is the waveform of a logic output of the comparator 18, shown in FIG. 5D is the first clock signal, shown in FIG. 5E is the second clock signal, and shown in FIG. 5F is the waveform of a clock signal output from the selector 23 to the counter 16. The selector 23 produces this clock signal by switching between the first clock signal (FIG. 5D) and the second clock signal (FIG. 5E) according to the ON/OFF drive signal supplied to the transistor 7.

Figure 6:
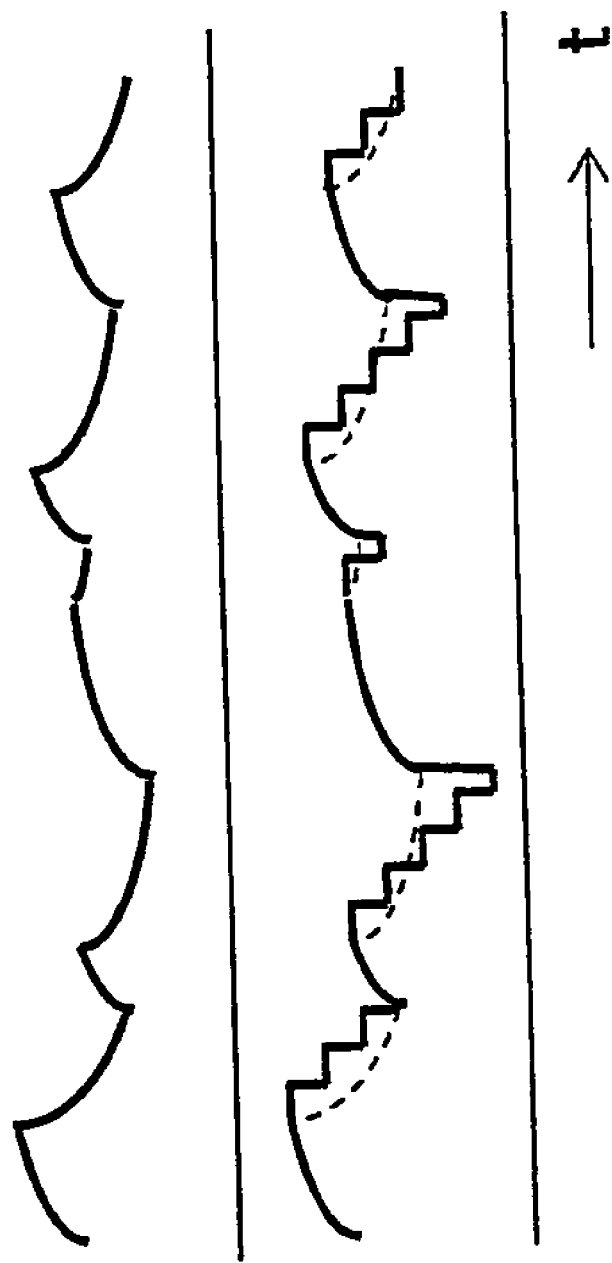
FIGS. 6A and 6B are diagrams showing waveforms observed over a longer time period than shown in FIGS. 5A to 5F.

FIGS. 6A and 6B are diagrams showing waveforms observed over a longer time period than shown in FIGS. 5A to 5F. Specifically, shown in FIG. 6A is the waveform of the field current flowing through the field coil 3, and shown in FIG. 6B is the waveform of the digital field current detection value output from the A/D converter circuit 15B when the clock frequency is decreased during the OFF period of the transistor 7.

It is understood from the foregoing discussion that the A/D converter circuit 15B of the third embodiment can deliver the digital field current detection value more closely duplicating the waveform of the field current actually flowing through the field coil 3 by using the current detecting resistor 9 of which one end is grounded as depicted in FIG. 4. This feature of the third embodiment makes it possible to configure the A/D converter circuit 15B with a low level of insulation and, thus, in compact size and at low cost.

Fourth Embodiment

Figure 7:
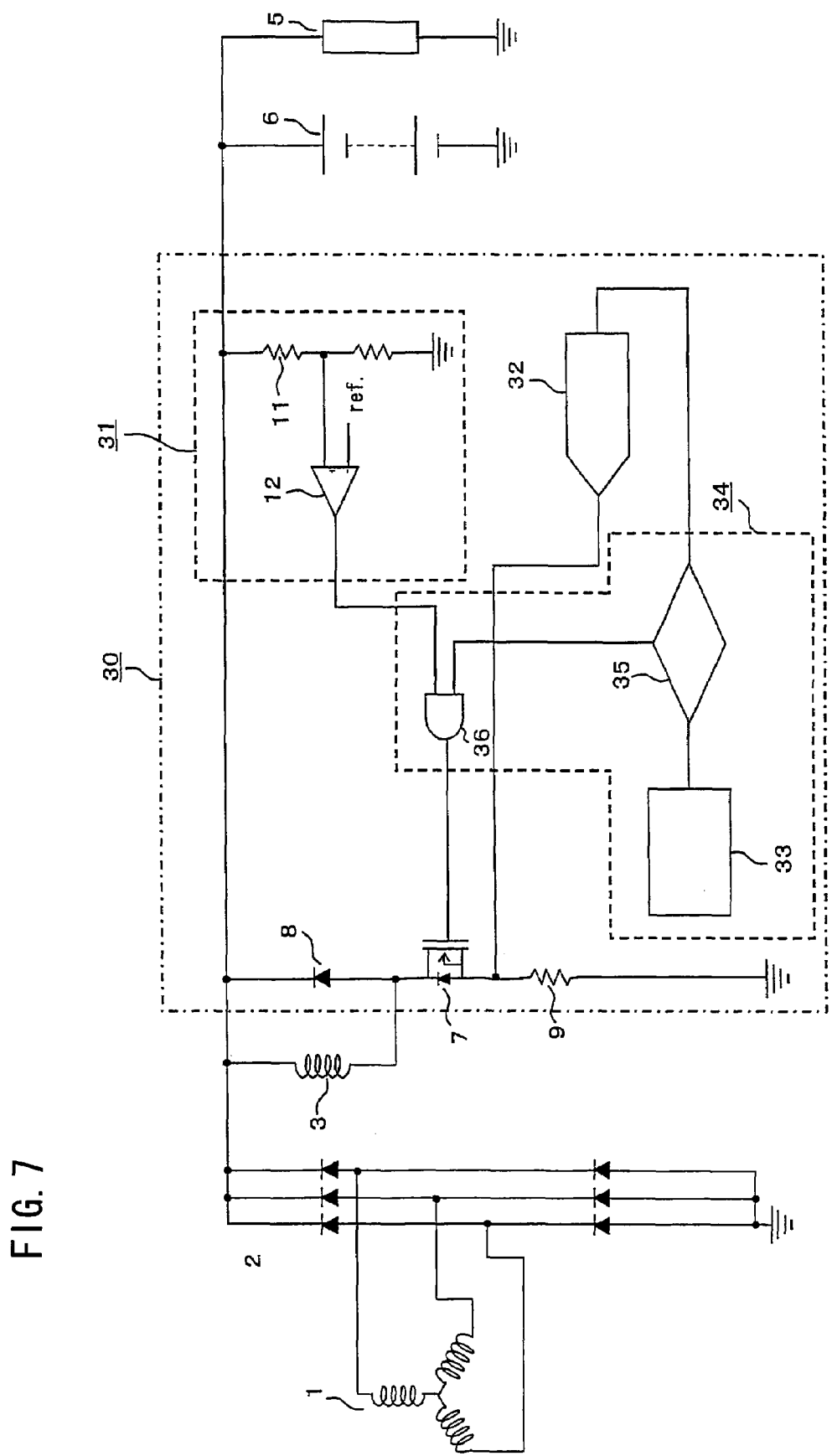
FIG. 7 is a block diagram of a control apparatus for controlling an automotive generator installed on a vehicle according to a fourth embodiment of the invention.

FIG. 7 is a block diagram of a control apparatus for controlling an automotive generator installed on a vehicle according to a fourth embodiment of the invention.

One known technique used in a control apparatus for an automotive AC generator for suppressing load torque exerted on a vehicle engine is to limit the field current so that the value of the field current does not exceed a specific level. The automotive generator control apparatus of the fourth embodiment features this kind of field current limiting function.

Now, a voltage regulator 30 provided with the aforementioned field current limiting function is described with reference to FIG. 7. The voltage regulator 30 includes a voltage control circuit 31, an A/D converter circuit 32 and a current limiting circuit 34. Like the voltage control circuit 10 of the foregoing embodiments, the voltage control circuit 31 outputs a result of comparison (logic operation) obtained by a comparator 12 by comparing a divided value of a DC output voltage of the voltage regulator 30 fed from a resistance type voltage divider 11 and a reference voltage. Like the A/D converter circuit 15 (15A, 15B) of the foregoing embodiments, the A/D converter circuit 32 outputs a digital field current detection value obtained by converting an analog field current detection value fed from a current detecting resistor 9 into a digital value.

The current limiting circuit 34 serving as a current limiter includes a current limit value memory 33, a comparator circuit 35 and an AND circuit 36. The current limit value memory 33 stores a current limit value in digital form. The comparator circuit 35 compares the digital field current detection value fed from the A/D converter circuit 32 and the digital current limit value fed from the current limit value memory 33. If the digital field current detection value is equal to or smaller than the digital current limit value, the comparator circuit 35 outputs a High (H) level signal, and if the digital field current detection value is larger than the digital current limit value, the comparator circuit 35 outputs a Low (L) level signal. Thus, when the field current detection value is equal to or smaller than the current limit value, the AND circuit 36 outputs an ON/OFF drive signal corresponding to a duty factor fed from the voltage control circuit 31, and when the field current detection value is larger than the current limit value, the AND circuit 36 outputs a signal which forcibly turns off the transistor 7.

Figures 8A, 8B:
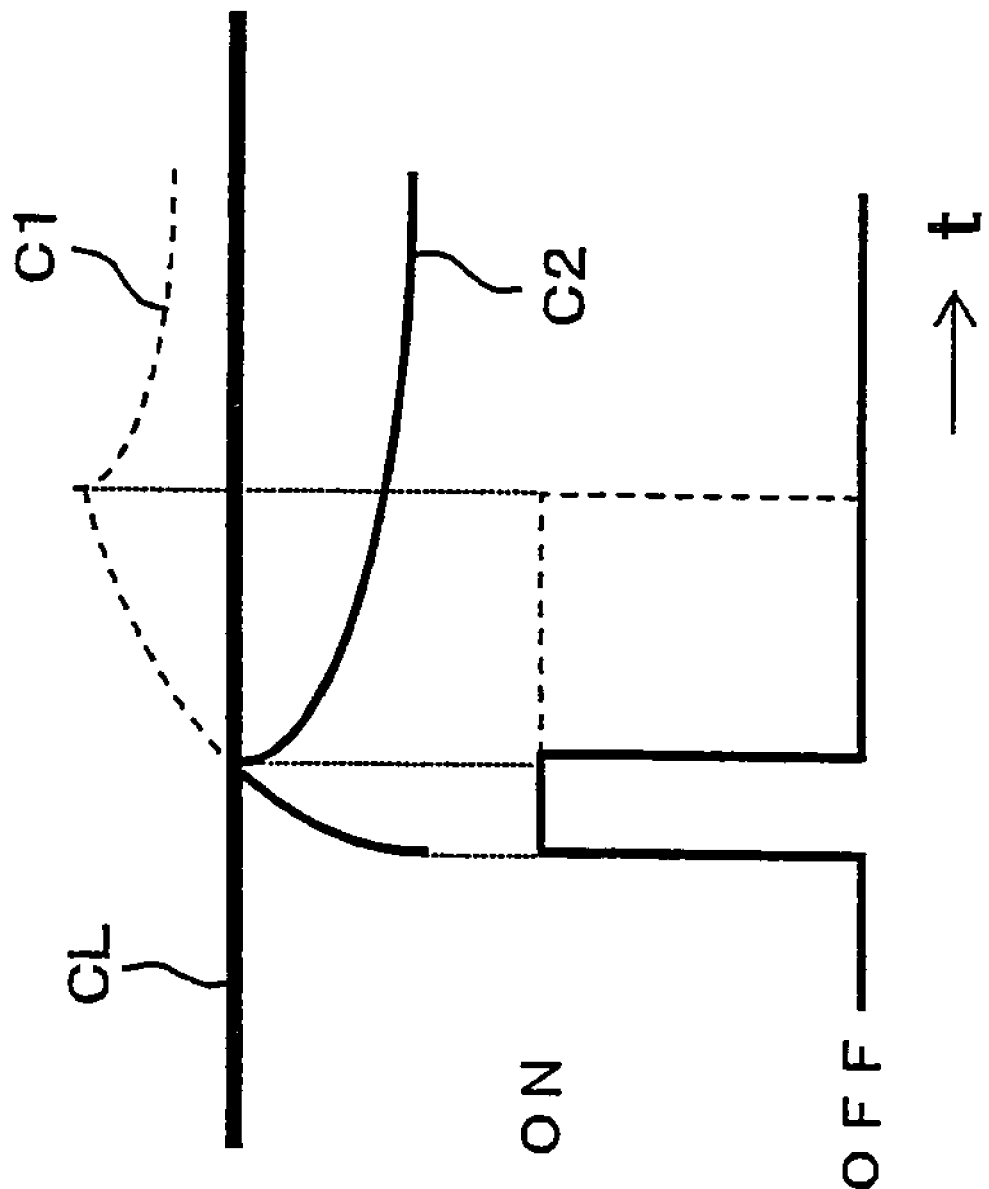
FIGS. 8A and 8B are diagrams showing operation executed by a field current limiting function.

FIGS. 8A and 8B are diagrams showing operation executed by the aforementioned field current limiting function. Referring to FIG. 8A, a thick solid line marked by CL shows the level of the current limit value, a broken line marked by C1 shows the waveform of the field current obtained when the field current limiting function is not implemented, and a thin solid line marked by C2 shows the waveform of the field current obtained when the field current limiting function is implemented.

The automotive generator control apparatus of the above-described fourth embodiment prevents the occurrence of overcurrent exceeding the current limit value flowing through the field coil 3 in a reliable fashion due particularly to the provision of the current limiting circuit 34. Also, since a desired current limit value can be set as an easy-to-store digital value and the digital field current detection value is compared directly with the current limit value stored in the current limit value memory 33, the automotive generator control apparatus, in particular the current limiting circuit 34, can be made with a simple circuit configuration at low cost, yet providing improved reliability.

Fifth Embodiment

Figure 9:
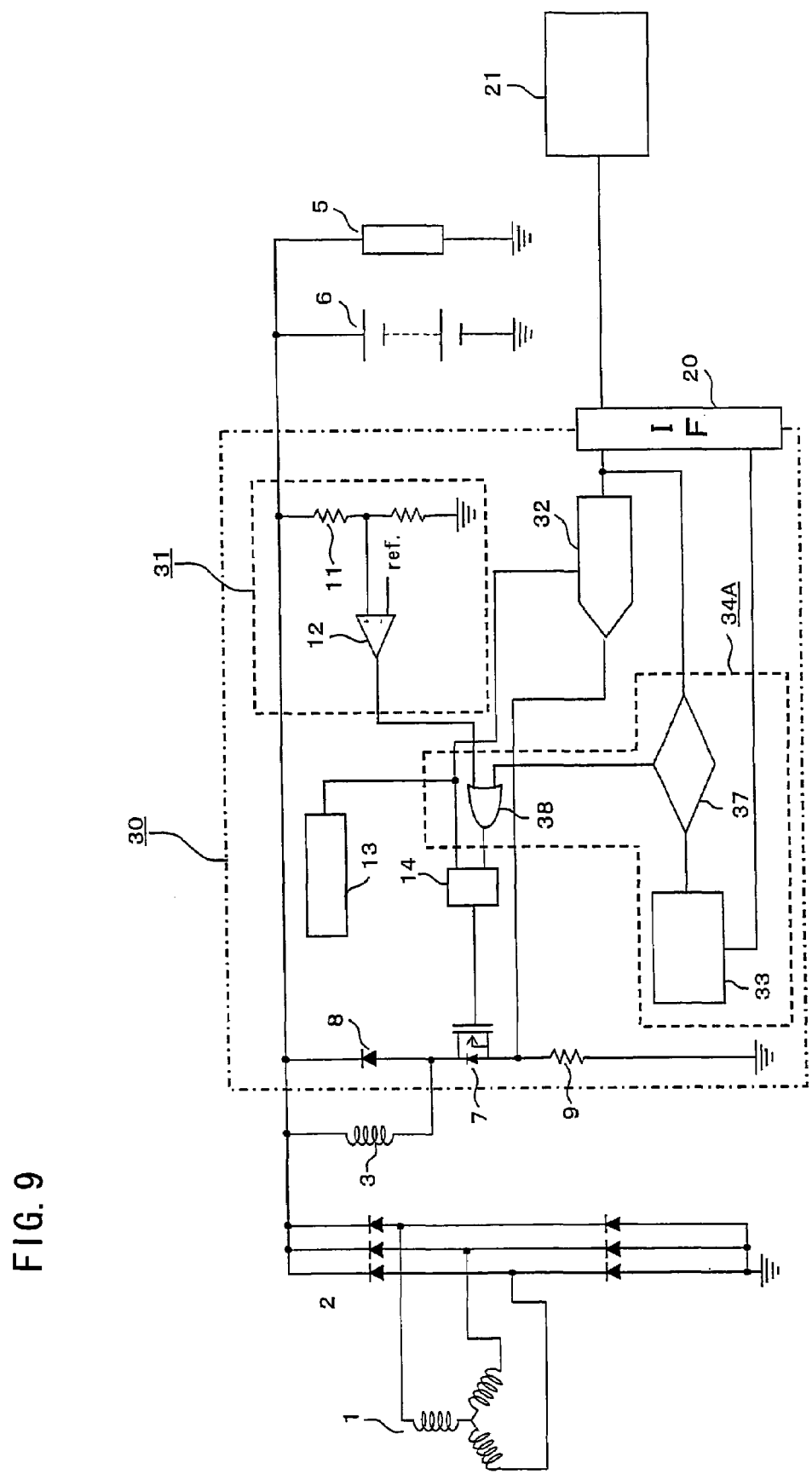
FIG. 9 is a block diagram of a control apparatus for controlling an automotive generator installed on a vehicle according to a fifth embodiment of the invention.

FIG. 9 is a block diagram of a control apparatus for controlling an automotive generator installed on a vehicle according to a fifth embodiment of the invention.

While the automotive generator control apparatus of this embodiment also has a field current limiting function like that of the fourth embodiment, the automotive generator control apparatus of the fifth embodiment offers an additional function which makes it possible to overwrite an already stored current limit value from the external control unit 21. This function satisfies the need to set the current limit value from the external control unit 21, or the ECU of the vehicle, according to engine operating conditions.

Referring to FIG. 9, a voltage regulator 30 of the fifth embodiment includes a voltage control circuit 31, an A/D converter circuit 32 and a current limiting circuit 34A. The voltage control circuit 31 and the A/D converter circuit 32 are the same as those of the fourth embodiment except that the A/D converter circuit 32 employs a counter which operates with a clock signal fed from a clock signal generator 13 as in the aforementioned first embodiment and a digital output value of the A/D converter circuit 32 is transmitted to the external control unit 21 via a communication interface 20 as explained in the first embodiment.

The current limiting circuit 34A serving as a current limiter includes a current limit value memory 33, an equality judgment circuit 37 and an OR circuit 38. The current limit value memory 33 stores the aforementioned current limit value in digital form. In this embodiment, the current limit value once stored in the current limit value memory 33 can be overwritten from the external control unit 21 via the communication interface 20 as mentioned above. The equality judgment circuit 37 compares the digital field current detection value fed from the A/D converter circuit 32 and the digital current limit value fed from the current limit value memory 33. If the digital field current detection value is equal to the digital current limit value, the equality judgment circuit 37 outputs an H level signal to the OR circuit 38.

Under normal operating conditions where the field current detection value is less than the current limit value, the two values do not equal each other, so that a logic circuit 14 outputs an ON/OFF drive signal corresponding to a duty factor to a transistor 7 based on a signal fed from the voltage control circuit 31. As the field current detection value increases and exceeds the current limit value, the two values equal each other at a specific point in time. At this point in time, the logic circuit 14 is reset by the H level signal output from the equality judgment circuit 37, and the logic circuit 14 outputs a signal which turns off the transistor 7.

While the current limiting circuit 34A includes the equality judgment circuit 37 for detecting an overcurrent by judging whether the digital field current detection value fed from the A/D converter circuit 32 and the digital current limit value fed from the current limit value memory 33 coincide with each other, the aforementioned circuit configuration of the voltage regulator 30 may be modified such that the current limiting circuit 34A includes an adder instead of the equality judgment circuit 37. The automotive generator control apparatus thus modified produces completely the same advantages as that of the fifth embodiment. Specifically, the transistor 7 is forcibly turned off by using an inverted value (reversed polarity) of the sum of the two values given by the adder.

The automotive generator control apparatus of the above-described fifth embodiment prevents the occurrence of overcurrent exceeding the current limit value flowing through the field coil 3 in a reliable fashion due particularly to the provision of the current limiting circuit 34A. As in the foregoing fourth embodiment, a desired current limit value can be set as an easy-to-store digital value and, thus, the automotive generator control apparatus, in particular the current limiting circuit 34A, can be made with a simple circuit configuration at low cost, yet providing improved reliability. In addition, the automotive generator control apparatus of the fifth embodiment makes it possible to overwrite the already stored current limit value from the external control unit 21. This feature offers enhanced controllability of the vehicle.

In summary, a control apparatus for controlling an automotive generator in a first principal form of the invention includes a field current detector for detecting a field current flowing through a field circuit of the automotive generator, and an A/D conversion device for converting an analog field current detection value detected by the field current detector into a digital value and outputting the digital value to an external control unit. The A/D conversion device of this automotive generator control apparatus includes a counter, a D/A converter for converting a digital output of the counter into an analog value, a comparator for comparing an output of the D/A converter and the analog field current detection value, and an up/down control circuit for switching the counter between count-up and count-down operations according to an output of the comparator such that the output of the D/A converter follows the analog field current detection value. The output of the counter is output to the aforementioned external control unit.

In the aforementioned automotive generator control apparatus of the first principal form of the invention, the field circuit preferably includes a field coil to which a DC output voltage of the automotive generator is supplied, a switching device connected in series with the field coil, whereby switching on/off operation of the switching device controls the field current flowing through the field coil such that the DC output voltage follows a specific reference voltage, and a diode connected in parallel with the field coil for recirculating the field current flowing through the field coil when the switching device is in an OFF state, wherein the aforementioned field current detector outputs a voltage generated by a detecting device which is connected in series with the switching device as the analog field current detection value.

The automotive generator control apparatus thus configured makes is possible to obtain a digital field current detection value more closely duplicating the waveform of the field current actually flowing through the field coil with a simple circuit configuration at low cost than achieved by using an ON/OFF drive signal supplied to the switching device.

A control apparatus for controlling an automotive generator in a second principal form of the invention includes a field coil to which a DC output voltage of the automotive generator is supplied, a switching device connected in series with the field coil, whereby switching on/off operation of the switching device controls a field current flowing through the field coil, a diode connected in parallel with the field coil for recirculating the field current flowing through the field coil when the switching device is in an OFF state, a field current detector for outputting a voltage generated by a detecting device which is connected in series with the switching device as an analog field current detection value, an A/D conversion device for converting the analog field current detection value detected by the field current detector into a digital value, a current limit value memory for storing a specific current limit value in digital form, a voltage control circuit for outputting an ON/OFF drive signal to the switching device such that the DC output voltage of the automotive generator follows a specific reference voltage, and a current limiter to which an output of the A/D conversion device and the current limit value are input, whereby the current limiter turns off the switching device when the output value of the A/D conversion device exceeds the current limit value regardless of the ON/OFF drive signal. The A/D conversion device of this automotive generator control apparatus includes a counter, a D/A converter for converting a digital output of the counter into an analog value, a comparator for comparing an output of the D/A converter and the analog field current detection value, and an up/down control circuit for switching the counter between count-up and count-down operations according to an output of the comparator such that the output of the D/A converter follows the analog field current detection value. The output of the counter is output to the aforementioned current limiter.

In the aforementioned automotive generator control apparatus of the second principal form of the invention, the output of the A/D conversion device is transmitted to an external control unit via a communication link, and the current limit value stored in the current limit value memory can be overwritten from the external control unit via the communication link.

This feature of the invention offers enhanced controllability of the vehicle.

In one feature of the invention, the control apparatus further includes a counting operation stopper for interrupting the counting operation of the counter when the switching device is set to the OFF state.

This feature of the invention makes is possible to obtain a digital field current detection value more closely duplicating the waveform of the field current actually flowing through the field coil with a simple circuit configuration at low cost.

In another feature of the invention, the control apparatus further includes a clock frequency switcher for switching operating clock frequency of the counter such that the counter performs the counting operation at a first clock frequency when the switching device is in an ON state and at a second clock frequency which is lower than the first clock frequency when the switching device is in the OFF state.

This feature of the invention makes is possible to obtain a digital field current detection value still more closely duplicating the waveform of the field current actually flowing through the field coil with a simple circuit configuration at low cost.

In still another feature of the invention, the first and second clock frequencies are set based on a conducting time constant of the field coil such that the waveform of an output of the A/D conversion device resembles the waveform of the field current flowing through the field coil.

This feature of the invention makes is possible to obtain a digital field current detection value closely duplicating the waveform of the field current actually flowing through the field coil in a reliable fashion.

While the invention has been described with reference to the specific embodiments thereof in which the invention is applied to the field circuit of the automotive generator, the invention is applicable to other types of generators such as those in which a DC output voltage of the generator is supplied to the field coil. Additionally, the switching device need not necessarily be a transistor shown in the foregoing embodiments. Even if other type of switching device than the transistor is used in the generator, the invention is applicable in the same way as thus far discussed, yet offering the same advantages as in the foregoing embodiments.

What is claimed is:

1. A control apparatus for controlling an automotive generator, said control apparatus comprising:
    a field current detector for detecting a field current flowing through a field circuit of the automotive generator; and
    an A/D conversion device for converting an analog field current detection value detected by said field current detector into a digital value and outputting said digital value to an external control unit;
    wherein said A/D conversion device includes:
        a counter;
        a D/A converter for converting a digital output of said counter into an analog value;
        a comparator for comparing an output of said D/A converter and the analog field current detection value; and
        an up/down control circuit for switching said counter between count-up and count-down operations according to an output of said comparator such that the output of said D/A converter follows the analog field current detection value; and
    wherein the output of said counter is output to said external control unit.

2. The control apparatus according to claim 1, wherein said field circuit includes:
    a field coil to which a DC output voltage of the automotive generator is supplied;
    a switching device connected in series with said field coil, whereby switching on/off operation of said switching device controls the field current flowing through said field coil such that said DC output voltage follows a specific reference voltage; and
    a diode connected in parallel with said field coil for recirculating the field current flowing through said field coil when said switching device is in an OFF state; and
    wherein said field current detector outputs a voltage generated by a detecting device which is connected in series with said switching device as the analog field current detection value.

3. A control apparatus for controlling an automotive generator, said control apparatus comprising:
    a field coil to which a DC output voltage of the automotive generator is supplied;
    a switching device connected in series with said field coil, whereby switching on/off operation of said switching device controls a field current flowing through said field coil;
    a diode connected in parallel with said field coil for recirculating the field current flowing through said field coil when said switching device is in an OFF state;
    a field current detector for outputting a voltage generated by a detecting device which is connected in series with said switching device as an analog field current detection value;
    an A/D conversion device for converting the analog field current detection value detected by said field current detector into a digital value;
    a current limit value memory for storing a specific current limit value in digital form;
    a voltage control circuit for outputting an ON/OFF drive signal to said switching device such that the DC output voltage of the automotive generator follows a specific reference voltage; and a current limiter to which an output of said A/D conversion device and the current limit value are input, whereby said current limiter turns off said switching device when the output value of said A/D conversion device exceeds the current limit value regardless of the ON/OFF drive signal;

wherein said A/D conversion device includes:
- a counter;
- a D/A converter for converting a digital output of said counter into an analog value;
- a comparator for comparing an output of said D/A converter and the analog field current detection value; and
- an up/down control circuit for switching said counter between count-up and count-down operations according to an output of said comparator such that the output of said D/A converter follows the analog field current detection value; and wherein the output of said counter is output to said current limiter.

4. The control apparatus according to claim 3, wherein the output of said A/D conversion device is transmitted to an external control unit via a communication link, and the current limit value stored in said current limit value memory can be overwritten from said external control unit via the communication link.

5. The control apparatus according to claim 2 further comprising a counting operation stopper for interrupting the counting operation of said counter when said switching device is set to the OFF state.

6. The control apparatus according to claim 2 further comprising a clock frequency switcher for switching operating clock frequency of said counter such that said counter performs the counting operation at a first clock frequency when said switching device is in an ON state and at a second clock frequency which is lower than the first clock frequency when said switching device is in the OFF state.

7. The control apparatus according to claim 6, wherein the first and second clock frequencies are set based on a conducting time constant of said field coil such that the waveform of an output of said A/D conversion device resembles the waveform of the field current flowing through said field coil.

8. The control apparatus according to claim 3 further comprising a counting operation stopper for interrupting the counting operation of said counter when said switching device is set to the OFF state.

9. The control apparatus according to claim 3 further comprising a clock frequency switcher for switching operating clock frequency of said counter such that said counter performs the counting operation at a first clock frequency when said switching device is in an ON state and at a second clock frequency which is lower than the first clock frequency when said switching device is in the OFF state.

10. The control apparatus according to claim 9, wherein the first and second clock frequencies are set based on a conducting time constant of said field coil such that the waveform of an output of said A/D conversion device resembles the waveform of the field current flowing through said field coil.

* * * * *